United States Patent [19]

Back

[11] 4,094,512
[45] June 13, 1978

[54] SHAFT SEALS

[75] Inventor: Anthony Charles Back, Slough, England

[73] Assignee: Crane Packing Limited, Slough, England

[21] Appl. No.: 705,154

[22] Filed: Jul. 14, 1976

[51] Int. Cl.² .............................................. F16J 15/32
[52] U.S. Cl. .................................................... 277/27
[58] Field of Search .................. 277/2, 9, 11, 27, 205, 277/215

[56] References Cited

U.S. PATENT DOCUMENTS

| 3,334,905 | 8/1967 | Horwitz et al. | 277/27 |
| 3,360,274 | 12/1967 | Grant | 277/215 |
| 3,770,179 | 11/1973 | McHugh | 277/2 |

Primary Examiner—Robert I. Smith
Attorney, Agent, or Firm—Scrivener, Parker, Scrivener and Clarke

[57] ABSTRACT

A rotary mechanical seal assembly for a shaft comprises a freely floating ring of flexible material which has inner and outer axially directed lips to bear against the surfaces of the shaft and housing, at least one of these lips being normally out of contact with its associated surface so that no wear takes place. The seal is brought into action by the application of pressure either applied from an outside source or created by leakage past an adjacent upstream face-type seal for which the seal of the invention forms an emergency back-up. There may be a detector to sense the leakage. There could be two such lip seals facing one another.

11 Claims, 5 Drawing Figures

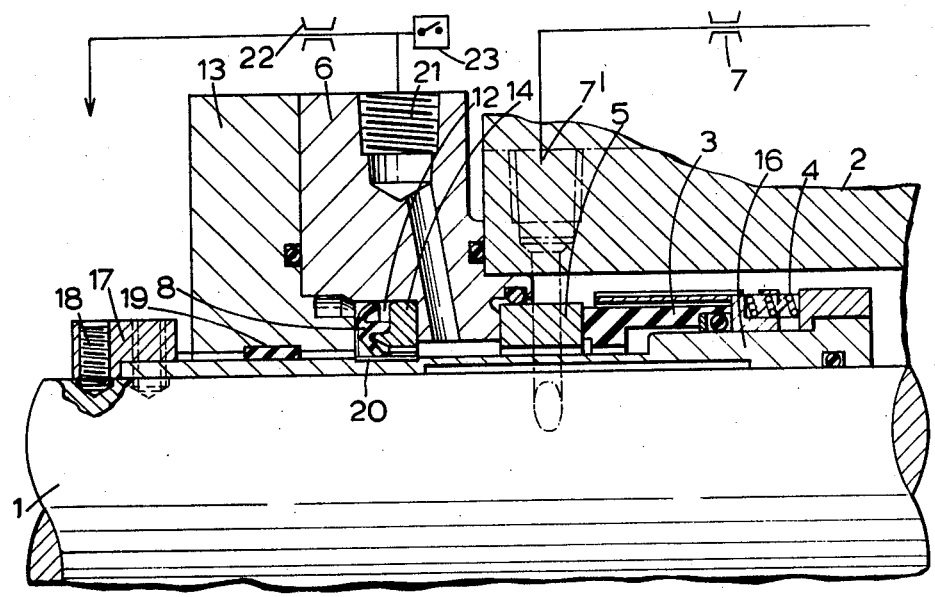
FIG. 1.
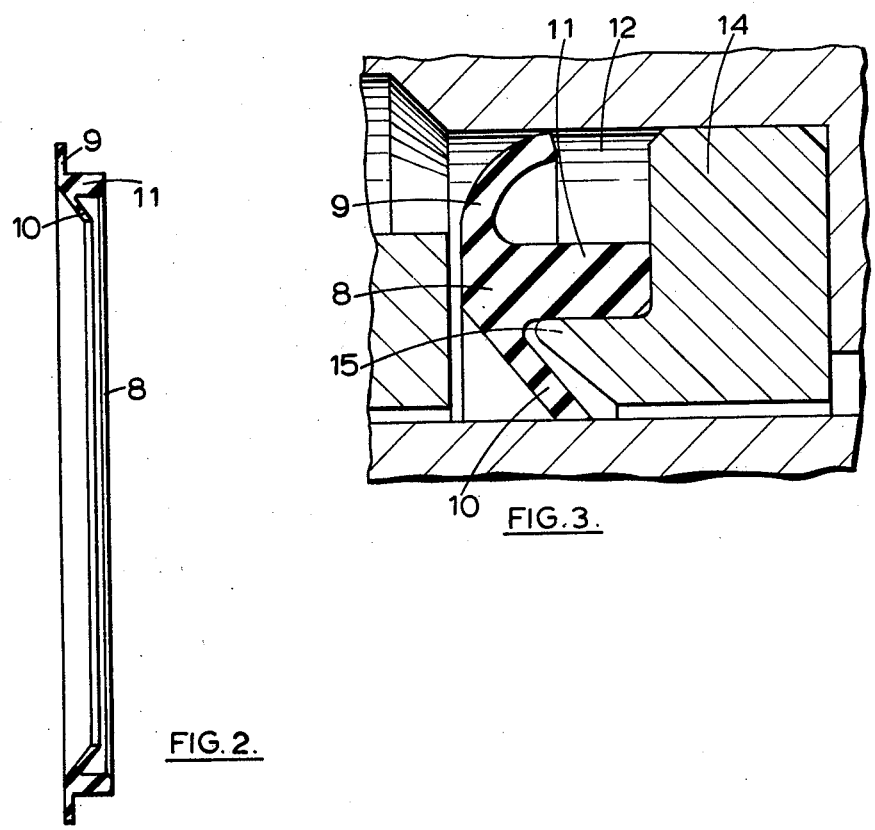
FIG. 2.
FIG. 3.

SHAFT SEALS

This invention relates to shaft seals. Where a shaft is sealed by a known kind of rotary mechanical face seal it may, in certain situations, be desirable to back it up with some form of emergency device which will at least provide a temporary seal, or a seal able to hold the pressure indefinitely under non-running conditions, in the event of failure of the main seal. Yet if this emergency seal is permanently in action it will itself be subject to wear and may indeed fail before the main seal, being consequently useless at the very moment when it is needed.

It is therefore desirable that the emergency device should only come into action when it is needed, i.e. on failure of the main seal. The aim of the present invention is to provide a device which achieves this.

According to the invention a rotary mechanical seal assembly suitable for use as an emergency seal and designed for a shaft mounted rotatably in a housing comprises a ring of flexible material which is free to float axially on the shaft, or on an external cylindrical surface associated with the shaft, and has inner and outer annular lips both facing in the same axial direction and capable of engaging and sealing respectively against the shaft or said surface on the one hand and against an internal cylindrical surface associated with the surrounding stationary housing on the other hand, the dimensions being such that in its free condition the ring is normally out of contact with the shaft or said external surface on the one hand and/or with the internal surface but comes into contact with both, to form a seal, when fluid pressure acts against that axial face of the ring towards which the lips are directed.

The ring may be of hammer-head cross-section, that is to say, with a central portion which is relatively rigid, with inner and outer limbs which form the lips and are more flexible.

In one example the dimensions are such that the inner lip of the ring is an interference fit on the shaft, so that the ring rotates with the shaft, whilst its outer diameter has a positive clearance from the adjacent internal cylindrical surface of the housing under normal conditions. However it is preferred to make the ring an interference fit in the housing and provide a positive clearance between its inner diameter and the shaft; the first mentioned version does have the merit that it intercepts any slight leakage of oil along the shaft and flings it clear by centrifugal force.

There is preferably also a radial surface (preferably on the housing but it could be a shoulder on the shaft) against which the downstream face of the ring comes into engagement when the ring moves axially under fluid pressure. This provides an extra seal and also the engagement of the ring against this surface helps the ring to expand radially to form the seal. The invention will now be further described by way of example with reference to the accompanying drawings, in which:—

FIG. 1 is a section through a rotary mechanical face seal assembly fitted with the emergency seal assembly according to the invention;

FIG. 2 is a section through the emergency seal element alone, in its free condition, to a larger scale;

FIG. 3 is a section to a still larger scale than FIG. 2, showing the emergency seal element in its normal fitted condition and engaged by its support ring;

Figure 5:
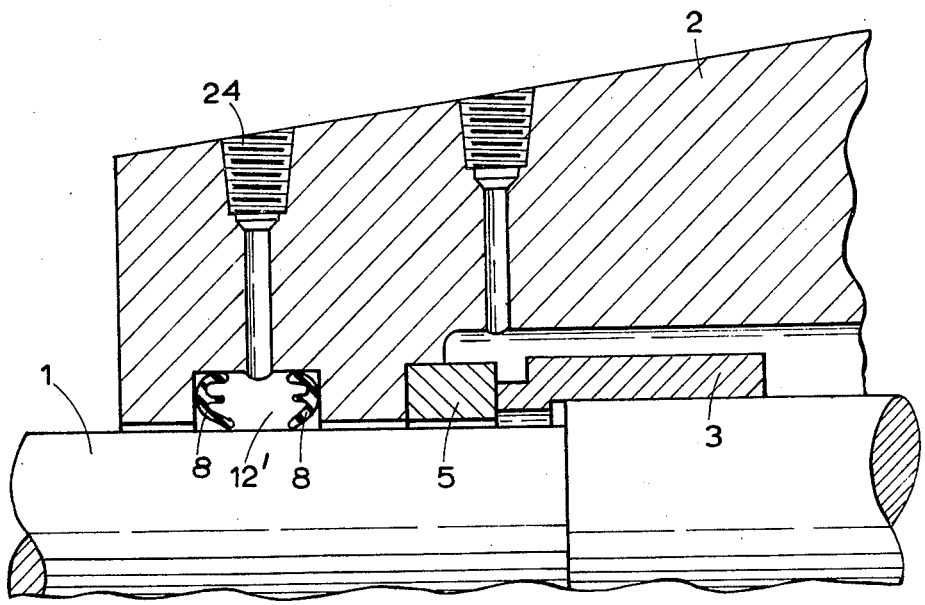

FIG. 5 shows yet another seal face assembly. Referring first to FIG. 1 this shows what is basically a known kind of rotary mechanical face seal assembly in which a shaft 1, to be sealed into a housing 2, carries a rotary seal face member 3 which is urged axially by helical coil compression springs, of which one is visible at 4, into rubbing contact with a stationary seat 5 which is sealed into the housing 2. The seat 5 is received in a clamping ring 6 secured to the face of the housing. A portion of the fluid product against which the seal is acting is fed under pressure through a restriction 7 and thence through connection 7 into the housing 2, so as to cause the product to circulate around the seal.

The emergency seal according to the invention comprises primarily an annular seal element 8 made of a suitable synthetic rubber or, better still, of PTFE. The profile of the element as made is shown in FIG. 2 and it will be seen that it comprises a radially outwardly projecting lip 9 and a lip 10 that projects inwards at an inclination to the axis of the element, together with a central axially extending cylindrical portion 11 which is thicker than the two lips and is therefore less flexible. The result is a profile of hammer-head form. This portion 11 serves to stiffen the element as a whole, enabling it to withstand high pressures, and it also prevents the lips 9 and 10 being damaged by contact with the end face of the space in which the element is received, described below.

The seal element 8 is received in an annular space 12 defined between a counterbore in the outer face of the clamping ring and a further ring 13 secured to it. Also within the space 12 is a rigid metal support ring 14 with an axially projecting lip 15 that engages the inside diameter of the cylindrical portion 11 of the seal element; this support ring serves to locate the element 8, radially during assembly, and also to stiffen it further.

In the example shown the shaft 1 is protected, in the region of the seals, by a sleeve 16 that is held in place by a ring 17 clamped to the shaft by grub screws 18. A split journal bearing 19 within the further ring 13 runs on the sleeve 16, for the purpose of complying with regulations that require restriction on the rate of leakage in the event of total failure of the seals.

The inner diameter of the emergency seal element 8 is such that under normal operating conditions the lip 10, which extends inwards in an inclined direction towards the main seal, is just out of contact with the external surface of the sleeve 16. However the outside diameter of the element 8, in its free condition is substantially greater than the diameter of the space 12 and so, as will be seen in FIG. 3, the lip 9 is deflected to a substantial degree and bears against the outside surface of the counterbore that defines the space 12 to form a sealing lip directed axially inwards, i.e. towards the main seal 3,5.

Under normal operating conditions, therefore, with the main seal performing its correct function of holding back the product in the housing 2, the emergency seal element 8 is stationary and has no function. Moreover it is not subject to any wear as the lip 10 is clear of the sleeve 16. Any slight leakage of fluid past the main seal is able to pass also the lip 10 and escape through a drain, not shown, from the lowest point of the left-hand end (as viewed in FIG. 1) of the space 12.

In the event of partial or complete failure of the main seal, however, the flow of fluid along the outside of the sleeve 16 will be sufficient to act on the lip 10 to deflect it into contact with the sleeve 16, forming an effective lip seal. The greater the pressure, the greater is the force with which the lip is held in sealing contact with the sleeve. In the example shown the sleeve 16 is provided with a deposit 20 of hard material to prevent local wear.

At the same time the element 8, which is normally floating within the space 12, is urged hard up against the left-hand end of that space and the outer lip 9 is urged hard against the outside surface of the space. The radial surface at the left-hand end of the space, against which the element 8 is pressed, itself forms a further seal in conjunction with the element 8.

The fluid that builds up in the space between the main seal and the emergency seal is allowed to escape to a limited extent via a connection 21 leading through a restriction 22 to drain (not shown) and at the same time the pressure that builds up is detected by a fluid pressure switch 23 which closes electrical contacts to signal an alarm or to take whatever other steps are required to cope with failure of the seal. In the meantime the shaft 1 is able to continue running for a substantial time without difficulty, thanks to the fact that the emergency seal element 8 is in a substantially unworn condition up to the moment of failure of the main seal. Moreover the emergency seal is able to hold back the pressure for an unlimited period when the shaft is not running.

The sleeve 16 may be omitted altogether and the seal element 8 could then, in an emergency, bear directly on the shaft. In a further modification the seal element 8 could have an inner lip normally in contact with the shaft(or sleeve) whilst its outer lip is normally just clear of the housing. In that case the element 8 would rotate with the shaft under normal running conditions but would be brought to a halt by the pressure build-up on failure of the main seal. This version has the advantage that slight leakage along the shaft from the main seal is flung off centrifugally by the rotating seal element 8 and therefore does not pass further along the shaft.

Instead of, or in addition to, the pressure switch 23 there could be means for detecting and signalling fluid flow rather than fluid pressure, but for the same purpose of drawing attention to failure of the main seal.

Finally, it would be possible to design the assembly so that both the inner and outer lips of the element 8 are out of contact with their respective engaging surfaces under normal running conditions but both come into engagement with the surfaces when pressure develops upstream of them.

Figure 4:
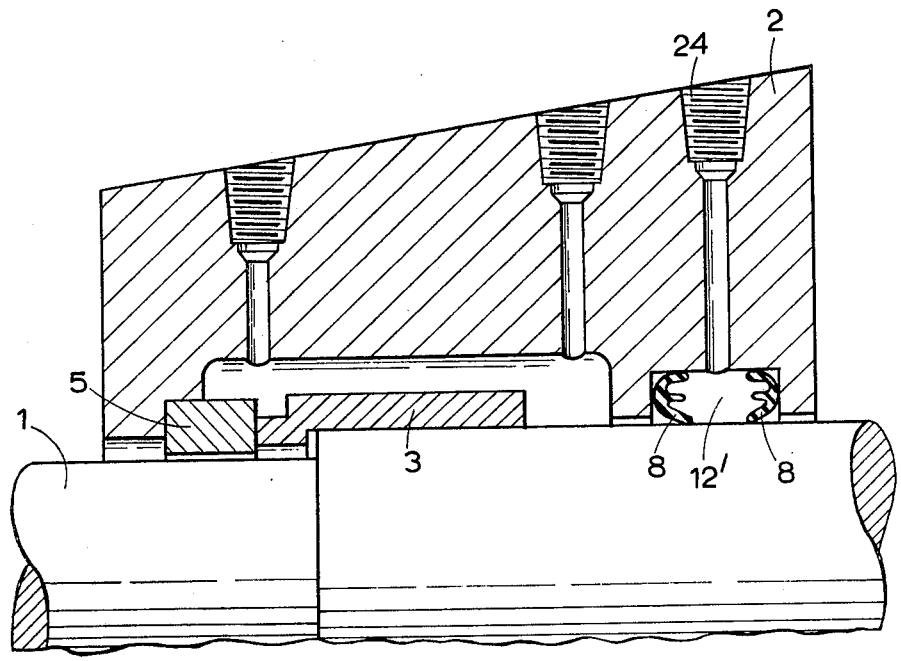
FIG. 4 is a view similar to FIG. 1 showing a modified seal face assembly.

FIG. 4 shows diagrammatically a layout similar to that shown in FIG. 1 but with two of the members 8 arranged facing opposite ways, with their concave sides towards one another. Corresponding reference numerals have been used where applicable. In this arrangement, instead of reliance being placed on the pressure of the fluid by passing the main seal to bring the emergency seal into action, the emergency seal, or rather each of them, is brought into action by applying fluid pressure from an external source through a connection 24 to the space 12' between the two seals. Thus in this case the emergency seal is brought into action by taking a positive step to apply pressure to it rather than simply by the fluid escaping past the main seal.

FIG. 5 shows a further modification of the layout shown in FIG. 4, in that the pair of emergency seals, again facing opposite ways, is upstream of, i.e. on the pressure side of, the main seal.

Although the preferred embodiments which have been described in detail has been shown used as an emergency seal backing up a main seal, it would be possible to use the seal element 8 on its own without a main seal where the circumstances allow this.

We claim:

1. A seal assembly between first and second relatively rotatable elements, said assembly comprising an external cylindrical surface on said first element, a ring of flexible material which is free to float axially on said cylindrical surface, said ring having inner and outer annular lips both directed in the same axial direction, an internal cylindrical surface in said second element disposed around said ring, said lips being capable of engaging and sealing respectively against the external cylindrical surface on said first element and against the internal cylindrical surface in said second element; the dimensions being such that in its free condition, said ring is normally out of contact with at least one of said surfaces but comes into contact with both, to form a seal, when fluid pressure acts against that axial face of the ring which faces in the direction towards which said lips are directed.

2. The seal assembly set forth in claim 1 wherein said inner lip is normally clear of said external cylindrical surface but said outer lip normally engages said internal surface.

3. The seal assembly set forth in claim 1 wherein said inner lip normally engages said external cylindrical surface but said outer lip is normally clear of said internal surface.

4. The seal assembly set forth in claim 1 wherein said ring includes an intermediate cylindrical portion, more rigid than both lips and extending axially, from its junction with said lips, in the same axial direction as said lips.

5. The seal assembly set forth in claim 4 including further a rigid support ring said support ring engaging the ring of flexible material and having an axially projecting portion that engages the cylindrical portion of said ring of flexible material.

6. The seal assembly set forth in claim 1 wherein that lip which normally engages its associated surface is, in the ring as manufactured, directed radially, being deflected resiliently from that radial direction by its engagement with the said surface.

7. The seal assembly set forth in claim 1 wherein said ring is made of polytetrafluoroethylene.

8. The seal assembly set forth in claim 1, wherein said first element includes a shaft and said second element includes a housing in which said shaft is rotatably mounted, in combination therewith, a rotary mechanical face seal carried on said shaft axially spaced from said seal assembly, the lips on said ring being directed towards said rotary mechanical face seal and being arranged to provide an emergency seal that only comes into action in the event of failure of said rotary mechanical face seal.

9. The combination of seal assemblies set forth in claim 8 including means for detecting and signalling the presence of fluid pressure and/or fluid flow in the region between said two seal assemblies that indicates failure of the rotary mechanical face seal assembly.

10. The combination of seal assemblies set forth in claim 8 including further a second seal assembly of the kind set forth in claim 1, facing the opposite way to the first such assembly and arranged between that seal assembly and said rotary mechanical face seal assembly.

11. The combination of seal assemblies set forth in claim 10 including a connection for allowing fluid pressure to be applied to the region between said first and second seal assemblies.

* * * * *